(12) United States Patent
Greenwood et al.

(10) Patent No.: US 6,681,145 B1
(45) Date of Patent: *Jan. 20, 2004

(54) METHOD FOR IMPROVING THE ACCURACY OF MACHINES

(75) Inventors: Thomas A. Greenwood, Sumner, WA (US); Thomas W. Pastusak, Kent, WA (US)

(73) Assignee: The Boeing Company, Seattle, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/867,857

(22) Filed: Jun. 3, 1997

Related U.S. Application Data

(60) Provisional application No. 60/019,196, filed on Jun. 6, 1996.

(51) Int. Cl.[7] ............................................. G06F 19/00
(52) U.S. Cl. ...................... 700/193; 700/176; 700/195
(58) Field of Search ........................... 29/897.2, 407.1, 29/407.04; 356/375, 358, 508; 318/593, 640, 570; 700/57–62, 176, 192–195, 110, 125, 109

(56) References Cited

U.S. PATENT DOCUMENTS

| 3,668,501 A | | 6/1972 | Chitayat ...................... 318/632 |
| 3,698,817 A | | 10/1972 | Iimura et al. ................ 356/156 |
| 3,719,879 A | * | 3/1973 | Marcy ......................... 318/593 |
| 3,930,730 A | | 1/1976 | Laurens et al. .......... 356/106 R |
| 4,365,301 A | * | 12/1982 | Arnold et al. .......... 364/474.32 |
| 4,370,720 A | | 1/1983 | Hyatt .......................... 364/474 |
| 4,543,635 A | | 9/1985 | Joó et al. .................... 364/474 |
| 4,621,926 A | | 11/1986 | Merry et al. ................. 356/363 |
| 4,815,213 A | | 3/1989 | McCabe et al. ........... 33/125 T |
| 4,892,407 A | | 1/1990 | McMurtry et al. ........... 356/375 |
| 4,919,967 A | | 4/1990 | Handke et al. ................. 427/8 |
| 4,928,019 A | | 5/1990 | Tomikawa et al. ........... 250/561 |
| 4,932,131 A | | 6/1990 | McMurtry et al. ............ 33/1 M |
| 4,976,019 A | | 12/1990 | Kitamura ..................... 29/26 A |
| 5,055,752 A | | 10/1991 | Leistensnider ............... 318/570 |
| 5,390,128 A | | 2/1995 | Ryan et al. ............. 364/474.35 |
| 5,507,091 A | | 4/1996 | Bullen .......................... 29/714 |
| 5,666,202 A | * | 9/1997 | Kyrazis ....................... 356/375 |
| 5,694,690 A | * | 12/1997 | Micale ........................ 29/897.2 |
| 5,903,459 A | * | 5/1999 | Greenwood et al. ......... 700/110 |
| 5,920,483 A | * | 7/1999 | Greenwood et al. ......... 700/193 |
| 5,949,685 A | * | 9/1999 | Greenwood et al. .... 700/195 X |

FOREIGN PATENT DOCUMENTS

| DE | 41 00 534 | 1/1992 |
| EP | 0075196 | 3/1983 |
| EP | 0109447 | 5/1984 |
| EP | 0298313 | 1/1989 |
| GB | 2083658 | 3/1982 |

* cited by examiner

Primary Examiner—Leo Picard
Assistant Examiner—Steven R. Garland
(74) Attorney, Agent, or Firm—John C. Hammar

(57) ABSTRACT

Large machines, especially those having working envelopes in excess of fifteen feet, exhibit unacceptable errors because of thermal expansion and mechanical misalignments between the axes. The errors have traditionally been minimized by enclosing the machine in a thermal enclosure, by careful calibration, or by mounting a laser interferometer on each axis. These solutions are costly, may require frequent recalibration, and do not correct for small rotations of one axis relative to another axis due to wear etc. The present invention uses an interferometric laser tracker or a comparable 3D position sensor to measure the position of a retroreflector attached to the end effector, e.g. a machine head when the machine comes to rest. A computer compares the measured position to the desired position according to the machine media, and adds the appropriate correction with trickle feed media statements to move the machine to the correct position prior to further machining.

17 Claims, 8 Drawing Sheets

METHOD FOR IMPROVING THE ACCURACY OF MACHINES

REFERENCE TO RELATED APPLICATION

The present application claims the benefit of U.S. Provisional Application No. 60/019,196, filed Jun. 6, 1996.

TECHNICAL FIELD

The present invention relates to machine control, and, more particularly, to a method using 3-dimensional laser measurement of the true position of a machine tool to augment the accuracy and control of a machine. The invention is especially useful in the accurate machining, inspecting, or both of a part based upon a digital definition of the part. A preferred method, apparatus, and related software provide end point control of the machine tool to place holes and other features accurately on aerospace structural detail parts.

BACKGROUND OF THE INVENTION

Machine tools exhibit dimensional positioning errors that are difficult to minimize. The primary contributors to these positioning errors are: (1) expansion and contraction of the machine structure and the workpiece (i.e., the part) because of thermal changes in the factory during machining, and (2) mechanical misalignments of and between individual axes of the machine. The accuracy of the machine is often so uncertain that post-machining inspection of the dimensions of the parts must be made using an independent measuring method. Such inspection requires special tools and skilled workers as well as significant factory space. It slows the production process. Failing inspection, parts must be reworked or scrapped. Post-production inspection, rework, and scrap are the result of poor design or manufacturing processes. The method of the present invention addresses the root cause for errors and, thereby, reduces the need for post-production inspection and the costs of poor quality.

A. Machine Error Control

National standards and "best practices" exist for determining and correcting NC machine geometry errors. (See ANSI/ASME B89.1.12M-1985, ANSI B89.6.2-1973, AMSE B.54-1992) These "best practices" constitute the currently accepted methods for achieving machine accuracy. We will discuss the standards and "best practices" briefly.

1. Thermally Controlled Environment

The machine is held at a constant temperature, e.g., 68° F., in an air-conditioned factory. Errors arising from temperature variations are reduced, but this method does not solve the thermal error problem entirely. Three main drawbacks are:

(i) The cost of controlling the environment is high and sometimes exceeds the cost of acquiring the machine.

(ii) Thermal effects induced by the machine itself ( e.g. motor heat from driving under load, and spindle heating due to friction) still can cause machine distortion (iii) Mechanical misalignment of axes remains uncorrected. Mechanical alignments change over time as the machine experiences normal and abnormal wear. They are essentially unpredictable, unavoidable, and difficult to control.

2. Machine Calibration

Three-axis machines have 21 error parameters in addition to the errors introduced with the machine spindle. The errors are linearity in each axis (3), straightness in each axis (6), squareness between each axis pair (3), and pitch, yaw, and roll in and between each axis (9). Machine calibration measures some or all of these 21 error parameters, then makes physical or software adjustments to the parameters which are out of tolerance. Once each error is identified, quantified, and minimized, the combination of errors are summed using the root mean squares algorithm to gain an estimate for the machine's overall working tolerance. Machine calibration is inadequate for two reasons. First, the method requires extensive machine downtime to measure and to adjust the error parameters. The difficulty in the measurement and adjustment is compounded by the fact that thermal variation causes dimensional changes from shift to shift and day to day. Second, because of constant readjustment of the machine, the changes mean that the final set of data is not a single "snapshot" of the machine errors, but are a series of snapshots each of a different parameter, at a different time, as the machine changes. The root cause of inaccuracy is not fixed, but simply is accommodated between readjustments. Production is a compromise and drift occurs in the produced parts as the machine tool changes.

3. Linear Interferometry of Each Machine Axis

The X, Y, and Z axes of a machine are each equipped with a linear interferometer as an accurate positional encoder. The method allows real-time compensation for thermal growth and shrinkage, but is inadequate for at least three reasons. First, it cannot be applied to rotary axes. Second, it does not compensate for mechanical misalignments between axes. Third, it does not address the interaction between axes as thermal changes occur.

4. Volumetric Look-up Table

This method accurately measures performance of the machine in a specified dimensional envelope. The accurate performance measurements are made using an independent, highly accurate measurement machine to determine the difference between the measured data and the commanded machine position. The collection of all such errors constitutes or can be used to generate an error map. A complete error map is used in two ways. First, the error map may be used as a look-up table to determine a simple position correction to the machine when in that vicinity. Second, polynomial equations can be calculated from the error map to interpolate error corrections over the entire measured envelope. The machine command for a position is adjusted with the polynomial equations. Look-up tables are inadequate primarily because the tables are valid for only one machine temperature. At other temperatures, the machine will be larger or smaller or have a slightly different geometry. There is no guarantee that a machine will behave isometrically and return to its original geometry as temperature changes occur. So, after a laborious data collection exercise leading to an empirical table or set of equations to adjust the position of the machine based upon its history of performance, the root cause(s) for inaccuracy will still continue to degrade the effectiveness of the error map. The error map is inherently inaccurate whenever the machine has changed. As the machine continues to wear and age, variations from the measured offsets of the original error map occur. As a result, errors in part construction may increase. Frequent recalibration is necessary to continue to have an accurate correct error map.

5. Combination of Methods

Certain combinations of these methods can be used to overcome weaknesses in the individual methods, but the net effect remains: (1) long downtime of the machine to measure its true position; (2) expensive testing; and (3) only temporary, corrective results. The root cause for the inaccuracies still remains. For instance, a combination of a thermally controlled environment with machine calibration can result in an accurate machine for a period of time. The cost of controlling the environment combined with the cost of machine downtime for checking and readjusting the machine can be expensive.

6. Thermal Compensation

The axes of the machine are equipped with thermal probes. The temperature measured by each probe is used to calculate independent from the other axes the theoretical expansion of that machine axis. The expansion factors are used to compensate the feedback to the controller, thus eliminating the expansion and contraction of the machine positioning capability. A newer but similar technique called "real time error correction" also uses thermal probes, but attempts to provide a 3D "error model" of the nonlinear thermal behavior of the machine structure. The error map reflects interdependence between axes, such as buckling or warping, caused by heating. Compensation is made with a complicated algorithm that is accurate only for the tested/measured envelope of variation and, then, only as the machine remains repeatable. This error model is established by gathering actual 3D machine position and corresponding temperature data over a range of temperatures, which can require significant machine downtime. It can also be difficult to place the machine in the desired thermal status. While the purpose of this technique is to avoid the costs associated with thermal control, thermal control is required to produce the error model. Thermal compensation follows the same concept as thermal control: modify the machine movement based on actual temperature measurements.

There are two main drawbacks to the thermal compensation method. First, thermal compensation requires periodic machine downtime to calibrate the sensors and the error model. Second, thermal compensation focusing on the machine does not correct for the expansion of the part or tooling fixtures. If it were possible to eliminate all positioning errors of the machine and perfectly to adjust the machine for temperature, the part could still be made out of tolerance because of the temperature effects on the part. Thermal compensation attempts to compensate for the part expansion indirectly by compensating for the machine errors caused by temperature changes. The correlation between the machine errors and the total error, however, is only a partial solution.

In U.S. Pat. No. 4,621,926, Merry, et al. describe an interferometer system for controlling non-rectilinear movement of an object. The system uses three, one-dimensional tracking laser interferometers rigidly mounted in a tracker head to track a single retroreflector mounted on the machine tool end effector. The Merry system is difficult to retrofit to an existing control system for a machine, because its laser feedback is designed to replace the conventional machine controller.

In the system of the present invention, the laser tracker operates independently from the machine controller to provide positional feedback information to the controller in trickle-fed Media blocks. [By "trickle feed" we mean that motion control information is provided (downloaded) to the machine controller a little bit at a time (in single NC Media blocks, for example) rather than as a complete program.] Our much larger working envelope (ten times larger than Merry) uniquely makes our system applicable to the manufacture and assembly of large aerospace structure, like wings, and our system design allows implementation readily on a large variety of existing machine controllers.

Merry determines the location of the retroreflector using trilateration. During set up and calibration, the machine moves in a straight line at constant speed along one independent axis for the system to establish a frame of reference for the end effector and to provide coordinate data to connect the laser interferometric position measurements with the end effector motion. Each interferometer is a one-dimensional (single axis) measurement system which generates a signal proportional to the distance of the retroreflector from the interferometer. With three output signals, the Merry control system uses trilateration to calculate the location of the end effector, compares this location with the desired location based upon a stored, predetermined path for motion of the end effector (i.e., the NC program), and actuates the tool's motive assembly to move the end effector to the next desired location. Laser trilateration has not been adopted in industry because of its cost, instability, setup geometry requirements, and natural inaccuracy. Trilateration works best if the three interferometers are widely spaced, but the retroreflector is essentially a one-axis target. To track the target, the interferometers must be close together which introduces significant interpolation or calculation errors. Futhermore, trilateration actually requires four interferometers to determine absolute, true position.

Merry's system replaces the standard machine controller with laser interferometric position measurement actually and directly to control of the tool. By overriding the machine controller, control of the machine might be lost, for example, if chips obscure the laser beam. For high value parts, the risk of loss of control is unacceptable. The Merry system, accordingly, has not been implemented for practical use in industry because of the problems it poses.

In a preferred embodiment of the present invention, static optical machine control (SOMaC) is able to adjust the machine media to accommodate translations, rotations, or both of the machine, part, or both. SOMaC does so by measuring the position of the part and the machine and scaling for changes from the original reference location and orientation of the part and machine. SOMaC also can adjust (scale) the machine media to accommodate changes in the part, machine, or both arising from changes in factory temperature, temperature of the part, temperature of the machine, and other physical changes in the factory environment.

The SOMaC system of the present invention provides fail-safe machine control because it continues to use the machine tool's conventional encoders, but augments the true position accuracy in static operation by providing "on-the-fly" inspection feedback through optical measurement of the true position. Our system corrects for the machine positioning errors with trickle feed instructions when the machine is at rest and ready for its next machining operation.

The Merry system cannot determine the location of the workpiece in relationship to the machine using the three interferometers alone. SOMaC is able to locate the machine relative to the workpiece using the single interferometer. Knowing this reference, SOMaC can provide delta correction commands to the machine controller after measuring the true position of the machine's end effector to enhance the machine's accuracy.

B. Laser Trackers

Real-time 3D optical measurement systems (e.g. laser trackers) are state-of-the-art measurement systems that obtain large quantities of accurate 3D data quickly. These optical measurement systems typically include an absolute ranging capability and a motorized angle steering head to steer the laser beam. The steering is controlled by a feedback system that continually drives the laser beam to follow ("track") the retroreflector. The laser beam is directed from the laser tracker head into a retroreflective target which is mounted on the machine end effector. The return beam allows the tracking head to determine both the distance and the direction (i.e., the horizontal and vertical angles) to the retroreflector. These three measurements (range, horizontal angle, vertical angle) establish a spherical coordinate system which can easily be transformed into the Cartesian coordinate system.

Laser tracking systems have the following characteristics:
(1) Accurate 3D measurement of about 10 part per million (ppm) volumetric accuracy (0.1 mm in a 10 meter volume);
(2) Real-time measurement collection and transmission;
(3) Data rates, in excess of 500 3D measurements per second (and typically as high as 1000 measurements per second);
(4) Simple calibration;
(5) Virtually immune to errors caused by changes in air temperature and pressure when using a high quality compensator (refractometer); and
(6) Large measurement volume using a retroreflective target, typically a partial sphere up to 100 feet in diameter.

Absolute ranging tracking interferometers can reaquire a target that has been temporarily blocked. Absolute ranging tracking interferometers are highly desirable in manufacturing operations, because movement of the machines, parts, and operators in the factory can lead to beam breaks. We prefer to use absolute ranging tracking interferometers, but many of our applications can also use the interferometer systems that are less tolerant of beam breaks.

Laser trackers have been used in many applications such as measuring the digital contour of aircraft or automobiles, tooling inspections, and NC machine accuracy testing. The present invention currently uses laser trackers, but other optical or non-contact measurement systems can be substituted for these systems to provide the positional feedback for the system.

In the aerospace industry, gantry or post-mill drilling machines range in size up to 70 meters long. The largest of these machines have working volumes in excess of 700 cubic meters. The positioning tolerance requirements for these machines are typically less than 0.20 mm. Attaining 0.50 mm positioning uncertainty within a 100 cubic meter volume is difficult. To standardize the uncertainty statement for NC machines, it is common to state the uncertainty of the machine in parts per million (ppm). The uncertainty, multiplied by one million then divided by the longest diagonal distance in the machine volume is the capability in terms of parts per million (ppm). For example, a typical machine with a 0.5 mm positioning capability and 15 meter diagonal length would yield a capability of 33 ppm. Large volume drilling machine capability below 30 ppm is difficult to achieve. As manufacturers strive to improve part quality and reduce assembly costs, the demand for more accurate hole drilling has increased. In aerospace manufacturing, these tighter tolerances can be as small as 0.10 mm over a 15 meter diagonal, which yields a standardized requirement of 6.7 ppm. Such tolerances exceed the capability of most machines.

SUMMARY OF THE INVENTION

The present invention involves static optical machine control (SOMaC) and seeks to overcome the thermal and mechanical error sources inherent to large machines by using an absolute ranging laser tracking system or its equivalent to measure the position and orientation of the machine end effector when the machine is stationary. These measurements are reported automatically through the SOMaC computer through trickle feed instructions for position adjustment to the machine controller. The machine controller then corrects the machine position as required. SOMaC uses an iterative technique to control the accuracy of the NC machine end effector. A standard deviation control protocol eliminates the effect of "noise" at the rest position. The protocol discriminates the rest position from machine motion or vibration. We incorporate alarms for tilt, especially for differential tilt of the machine, part, or tracker (using dual axis tilt sensors) and for temperature variation in the factory.

SOMaC uses "touch probe" or coordinate measurement machine software to locate critical features associated with the part during system calibration. These measurements establish a part frame of reference. During machining, SOMaC controls further operations based upon remeasurement and assessment of the location of these critical features. Because we establish a part frame of reference to which the machine adjusts, we eliminate the need for accurate part fixturing to establish a true position reference. The actual location of the part (and its features) is established by measuring the location of the features and comparing the measured location with the location established in a digital definition or digital dataset representation (CAD model) of the part. The comparison is used not only to calculate the actual part position, but also to calculate a "scale factor" for adjusting machine commands to compensate for differences between the actual part and the digital dataset representation. This "autoscale" feature, in effect, alters the NC Media derived from the engineering specification of the part to accommodate physical changes to the part that occur during machining, such as changes in the size of the part arising from changes in the factory temperature for the design standard 20° C. (68° F.). For example, we adjust the machine media to reflect the effect of expansion or contraction of the part because of its natural coefficient of thermal expansion. For "autoscale," we determine in parallel whether the scale factor that we calculate is consistent with the changes in size we would expect from changes in the factory temperature. We monitor the factory temperature (but could also monitor the part temperature and machine temperature) and rescale at appropriate intervals (e.g., a change of 2° or 5° at a user defined alarm set point) when the temperature changes. "Autoscale" is a batch or interval adjustment rather than a continuous rescaling, which reduces the processing required.

SOMaC preferably involves accurately positioning the end position of the end effector of a static machine with an independent 3D optical measurement device. It is applicable to any machine in which the positioning accuracy of the measurement device is better than the machine accuracy, which is usually true for laser trackers and large machines that have at least one axis greater than fifteen feet. By controlling the position of the end effector through the machine controller indirectly with the independent optical measurement system, the thermal errors and misalignment errors in the framework of the machine are rendered innocuous because true position of the end effector is monitored and adjusted without regard to these sources of error. With the SOMaC system using "best machining" practices, we obtain a maximum linear true position error of about 0.003 inch (i.e., 0.0015 inch radial misplacement) in a ten foot volume with a much tighter distribution for the offset error than is achievable simply with the machine tool's standard controller. We direct the end effector closer to the desired location specified in the digital dataset that defines the part or assembly using the machine tool's controller. Then, we verify that the end effector is actually in the correct location using an independent, highly accurate laser tracker or other position sensor. If out of position, we adjust the position of the end effector by sending a delta adjustment to the machine controller.

While some sources of error may be nonlinear to cause SOMaC to lose accuracy, we use least squares fit algorithms (or other appropriate regression analysis) to minimize these nonlinearities. Our first order (linear) correction is fairly robust and achieves a significant improvement in accuracy. SOMaC can accommodate more sophisticated algorithms as nonlinearities and anisotropies are understood.

SOMaC uses feedback from an optical measurement device and associated software to trickle feed position corrections to an existing machine encoder to improve machine accuracy. The system is fast, inexpensive, and reliable to provide position accuracy that is independent from the repeatability of the machine or the relationship of the machine to the workpiece. The system provides absolute spatial orientation/position information. Our preferred system includes the following features:

A. SOMaC controls the machine position at the end effector, thus eliminating major contributors to overall machine inaccuracy.

B. SOMaC can be used on a probe-capable machine to transfigure the machine into an accurate Coordinate Measuring Machine (CMM).

C. SOMaC transforms tracker measurements into the part's coordinate system, which reduces the complexity of the part-machine alignment calibration process.

D. SOMaC provides a Graphical User Interface (GUI) which allows the user to control various aspects of the machining operations. The software is a "real-time, event driven" system that interprets text files for the configuration and programming information.

E. SOMaC provides a graphical user interface displaying:
  (i.) the positioning accuracy desired;
  (ii.) statistical parameters relating to tracker measurement accuracy;
  (iii.) timing and position thresholds;
  (iv.) operational modes;
  (v.) offset and tracker/machine alignment;
  (vi.) NC feed control;
  (vii.) tracker position display and sample rates;
  (viii.) a temperature monitor and tilt monitor alarm set points,
  (ix.) on-line help.

F. By the nature of its software architecture, SOMaC is easily adapted to new machine controllers. An encoder interface software module is the only change needed to adapt the system to a new encoder/machine controller.

G. Portability. The trackers and workstation are physically portable and, therefore, a single system can be used to service many different machines.

H. Beam break recovery. SOMaC has two modes of recovery if a laser beam is interrupted.
  (i.) Manual Recovery: the system halts and allows the operator to return the retroreflector manually to the tracker, regain beam-lock, and then continue.
  (ii.) Automatic Recovery: the system returns the machine to a known location, commands the tracker to establish beam-lock, and then continues with the NC program.

I. SOMaC's architecture is easily adapted to new optical measurement systems, multiple measurement systems, or hybrid measurement systems.

J. SOMaC uses "trickle-feed" communication with a controller to integrate an NC machine with both the laser and the external software controller to create an easily packaged system that is capable of improving the accuracy of a machine. This method makes SOMaC applicable to a wide number of controllers with minimal integration effort.

K. SOMaC produces an audit trail of machining events. That is, SOMaC records the correction instructions it provides to the machine controller during the sequence of operations. With this data, it is easier to detect progressive machine drift or wear degradation or even to identify errors in the digital representation of the part.

L. SOMaC integrates the laser tracker with the machine in a computer remote from the machine controller so the system can be retrofit to many different NC controllers without software modifications to the controller.

The present invention relates to a method for improving the accuracy of machines. Machine mispositioning is corrected by providing delta position correction commands in machine media (e.g., NC Media) to a machine controller if a comparison of the true position of the machine tool under the control of the machine controller and the position in which the machine controller locates the machine tool based upon machine media instructions derived from an engineering specification of the part exceeds a predetermined offset threshold.

In one aspect, then, the present invention is a method for improving the accuracy of machines, comprising the steps of: (a) driving a machine tool having an end effector to a first commanded location based upon commands generated from a digital definition of the part or assembly on which the machine tool works; (b) precisely measuring the position of the end effector when the machine tool stops at the first commanded location; (c) comparing the measured position with the first commanded location; (d) sending delta correction commands to the machine tool to adjust the position of the end effector if the difference between the measured position and commanded position exceeds a predetermined threshold; (e) optionally, scaling the commanded position for thermal effects as derived from the digital definition with a thermal effect scale based upon deviation of the actual temperature of the workspace from the theoretical design criteria and adjusting the delta correction command in response to the thermal effect scale; (f) optionally, scaling the commanded position as derived from the digital definition with a configuration scale based upon measurement of a change in location of critical features on the part, assembly, or associated tooling and adjusting the delta correction command in response to the configuration scale; and (g) optionally, measuring the machined part using an inspection probe mounted in the machine and guided to a machine commanded position with machine commands derived from a digital definition of the part, the inspection involving measuring a set of inspection features, the measuring being conducted to accept the part and being augmented by providing delta correction commands to the machine to increase its accuracy, the delta correction commands being derived from comparing measurements of true position of the probe with the machine commanded position.

The invention also relates to a method for accepting a product by measuring its features in inspection tooling, comprising the steps of: (a) positioning a measurement probe in a spindle of a machine; (b) measuring selected inspection features on the product as a set of inspection measurements with the probe in accordance with an inspection sequence derived from the intended configuration of the product as specified in a digital definition of the product; and (c) scaling the intended configuration of the product as specified in the digital definition to adjust the relative size and position of features in accordance with measurement of changes in the actual configuration of the product in the inspection tooling caused by changes in factory conditions. Generally, such acceptance is done before removing the product from manufacturing tooling and manufacturing machines associated with making the product. This product acceptance method allows a manufacturer to use a machine tool for product inspection rather than needing a precision Coordinate Measuring Machine. Such "inspection" permits greater use of machine tools and reduces the overall capital expenses for tooling by making machine tools versatile as inspection devices.

The present invention also relates to computer software storage media having computer-readable information recorded to provide repositioning commands to a machine controller based upon a comparison of the measured true position of a machine tool end effector or inspection probe positioned at a commanded position using positioning data derived from a dataset representation (i.e., digital definition) of a part with the position to which the machine controller moves the end effector following the machine media implementing the position data.

The present invention also relates to a machine tool system having improved positioning accuracy, comprising: (a) a machine tool, including an end effector, adapted for performing a machining operation of a part; (b) a machine controller coupled with the machine tool for commanding movement of the machine tool to a commanded position through position control media derived from an engineering drawing or a digital dataset representation of the part; (c) at least one laser tracker positioned for measuring the true position of the end effector; (d) a computing system for comparing the measured position of the end effector with the commanded position and for providing trickle feed adjustment signals to the machine controller to offset any difference between the commanded position and the measured position; and (e) optionally, means for adjusting the commanded position derived from the digital dataset representation of the part for time varying factory conditions that impact size or orientation of the part.

The present invention also relates to a method for modifying the spatial specification of machine media representing a part configuration to compensate for a temperature difference between the design temperature and the actual temperature of the part or a manufacturing workcell, comprising the steps of: (a) creating a computer-readable dataset representation of an intended configuration of a part at a reference temperature; (b) upon a temperature change of a predetermined interval, measuring the part in the manufacturing workcell in sufficient locations to identify the relative change in size or orientation of the part attributable to factory conditions; and (c) adjusting the dataset representation by the ratio of the remeasurement/reference measurement.

Finally, the present invention relates to a method for modifying the spatial specification of machine media representing a part configuration to compensate for a changes in a part during its manufacture in a factory, comprising the steps of: (a) measuring the part in sufficient locations to identify the actual configuration in a first digital representation; (b) remeasuring the part to produce a second digital representation of the part; (c) comparing the second digital representation with the first digital representation to determine a scale factor; and (d) adjusting the machine media in accordance with the scale factor.

These and other features of the present invention will be better understood upon consideration of the accompanying drawings and the detailed description of the invention.

DETAILED DESCRIPTION OF A PREFERRED EMBODIMENT

Figure 1:
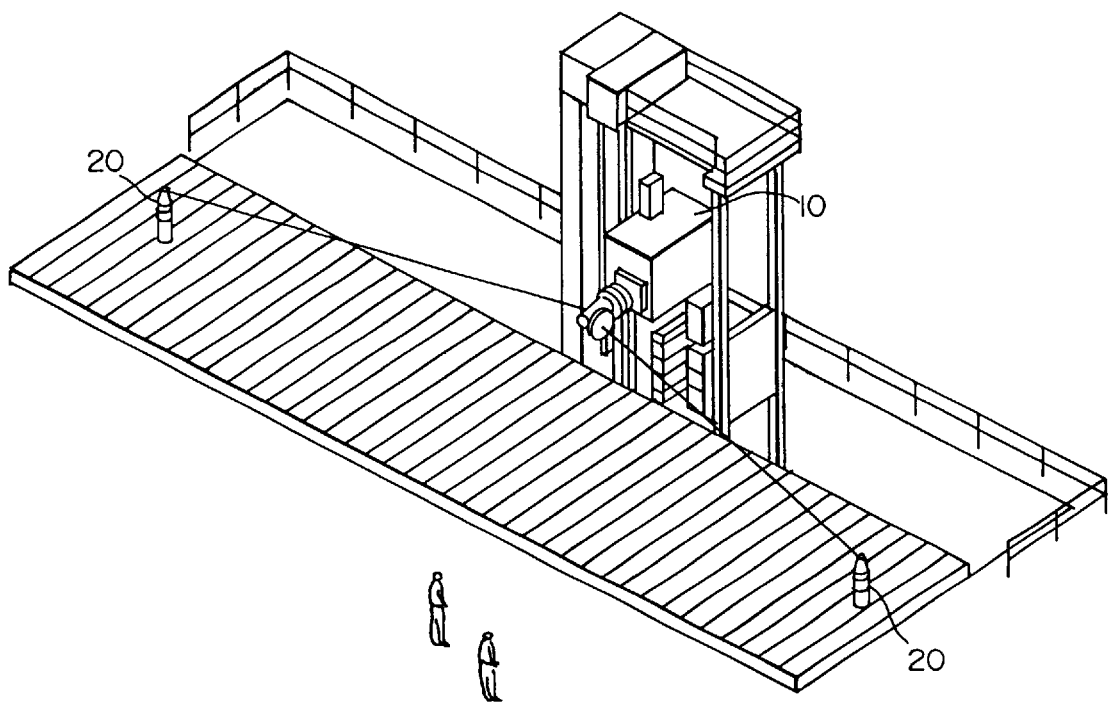
FIG. 1 is a schematic isometric view of the SOMaC concept with two, freestanding laser trackers positioned at extremes of a post mill's working envelope to improve the accuracy of a drill mounted on an otherwise conventional post mill.
Figure 2:
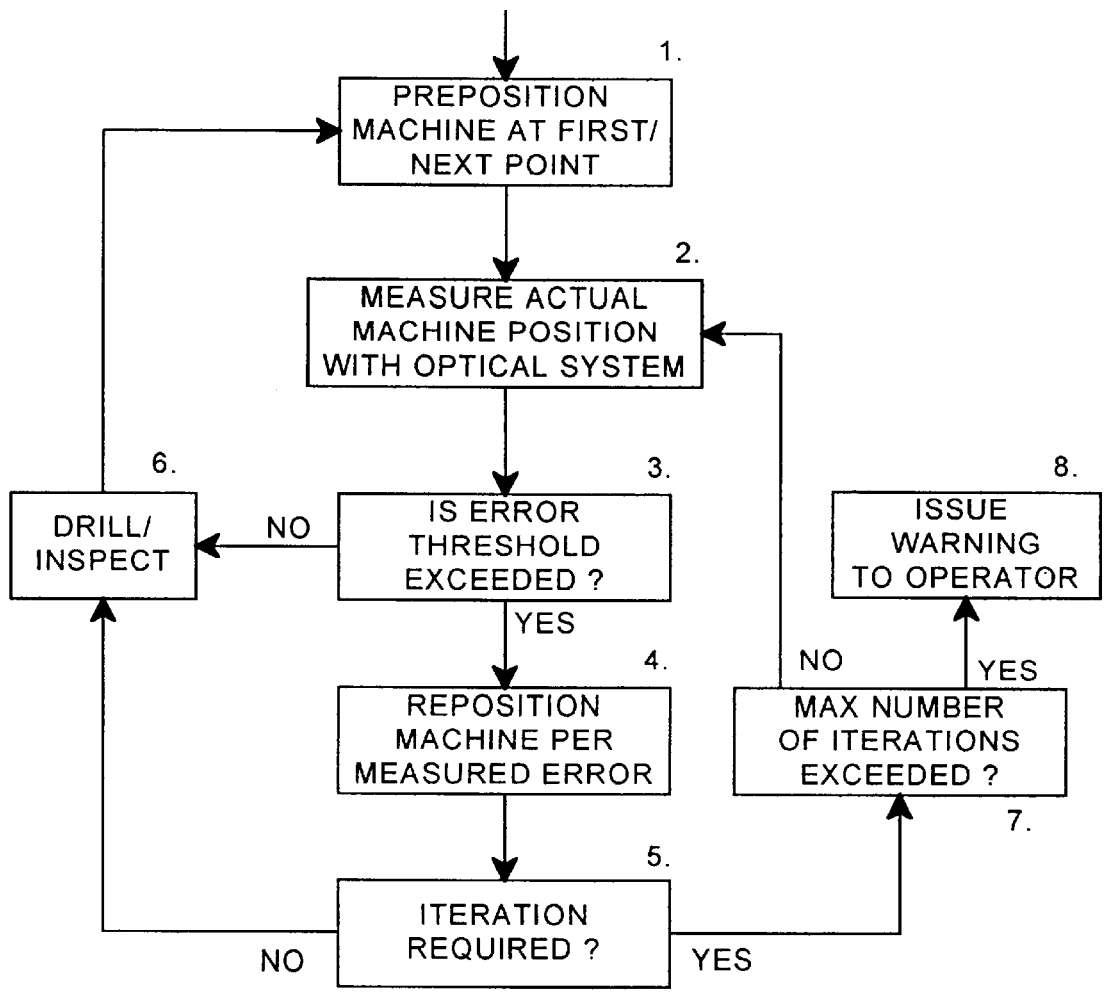
FIG. 2 is a block diagram of the SOMaC machine correction process.

After providing a general overview of SOMaC, we will describe the SOMaC hardware architecture. Then, we will describe the computing software architecture. Throughout this description, we will discuss an implementation of SOMaC for an NC machine, but the principles are applicable to robots, automated tools, machines, fixtures, and other objects that move under automatic or manual control.

Improving the accuracy of a machine, automated tool, or robot so that parts are manufactured closer to the engineering specifications involves augmenting the machine control with an independent, higher accuracy position measurement system to correct for machine and factory-induced errors. SOMaC provides delta correction commands in machine media to the machine controller to move the machine's end effector closer to the intended machining location. The independent measuring system identifies the true position of the end effector when the machine stops prior to machining. SOMaC then, adjusts for misplacement of the machine because SOMaC knows the relationship of the part or workpiece to the machine (i.e., the orientation) and measures both in a common frame of reference. To accomplish its augmentation function, which improves the $C_p$ of the machining process and lessens the rate of machine drift, SOMaC must have machine media derived from a digital definition of the part, must calibrate the machine and part to know their relative positions, must calibrate machine-mounted retroflectors (targets) to the precise position of a tool tip, and then, must execute augmented machine media to accomplish the machining operation while adding the delta correction commands.

Preparing the machine media involves deriving commands for moving the machine in a sequence of machining operations to produce the part that is specified in its physical characteristics in a digital definition (CAD model) of the part. The derived path and points are called "machine media," a set of software instructions that the machine controller can interpret. Machine media for product acceptance also must be derived from the engineering specification of the part. For product acceptance, an inspection probe will identify and measure critical features of the part to assure that the part does in fact correspond with the engineering specification.

Establishing the orientation of the part and machine, what we also call "calibration of the system" is described in greater detail at the end of this detailed description. Calibration sets the frame of reference between the independent, high accuracy measurement system, usually a laser tracker, and the machine and part. To calibrate, the tracker must measure at least three predetermined positions within the working volume of the machine.

Calibrating the retroreflectors generally involves touch probe measurement of critical features of the part with the machine while the tracker is also measuring the system. In effect, the coordinates are "synchronized" during this step as the machine and tracker agree that the location of each critical feature is at the coordinates that the machine media specifies. During this step, SOMaC also determines the initial reference scale which it will use with autoscale or real time orientation to adjust the machine media for changes in the part, machine, or both arising from factory conditions during manufacture of the part.

When the machine executes the machine media at each stoppage of the machine (or at other operator-defined intervals), SOMaC measures the true position of the end effector and computes the delta correction commands necessary to improve accuracy, including scaling adjustments.

SOMaC improves machine accuracy, especially of large NC machines. By improving accuracy, SOMaC produces parts that exhibit less variation. The parts are closer to the engineering specification and the natural drift in the accuracy that arises from machine wear or accumulation of errors is reduced significantly. Parts having smaller variation are easier to assemble. They assemble into structures that are closer to the engineering specification. SOMaC has the potential to eliminate the need for machine accuracy certification and post-process inspection. It dramatically reduces a manufacturer's tooling costs by allowing the manufacturer to upgrade its machines to increase their inherent accuracy and by making the manufacturer's machines more versatile. In one aspect, SOMaC can be used for product acceptance (inspection) in place of a Coordinate Measuring Machine (CMM). It allows manufacturer's to minimize capital, facility, and maintenance (lifecycle) costs which are critical goals at controlling product costs in today's world of lean and agile manufacturing. SOMaC reduces part and assembly cost, reduces overall manufacturing cycle time, improves the quality of parts and assemblies so that they correspond more closely with the engineering specification, and improves customer satisfaction because the improvement in product performance, at least for aerospace products. The performance improvement comes with reduced unit cost.

I. SOMaC Hardware Architecture

Figure 3:
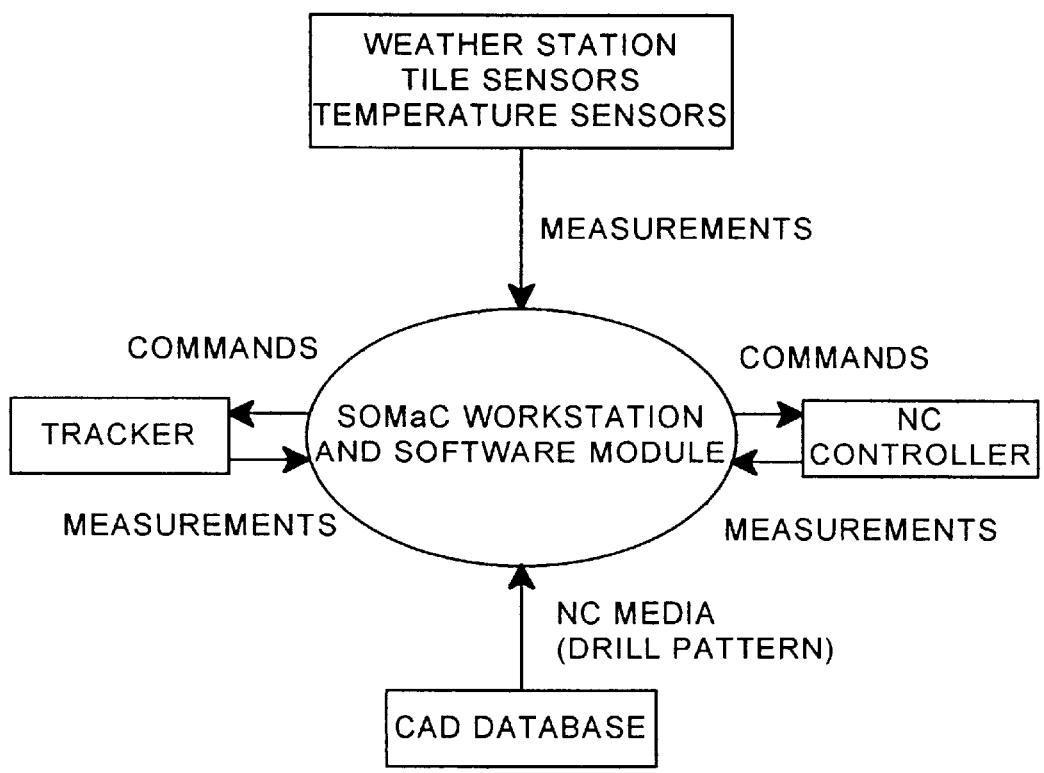
FIG. 3 is a block diagram of the SOMaC computing architecture hardware.

Five hardware elements (FIG. 3) of the preferred SOMaC system are: (1) the machine, (2) the machine controller, (3) the independent measurement system (e.g., laser tracker), (4) the independent measurement system controller, and (5) the workstation. Machines and their controllers are responsible for many aspects of machine control including part program control, operator interface, servo control, power distribution and control, encoder signal conditioning, and communication with external devices. Many machine controllers exist, with only minimal industry standardization. The diversity in controllers poses a significant problem when attempting to integrate or to migrate a capability such as SOMaC to a large base of installed machines. Our method for overcoming this problem will be addressed later in this description. The solution is important to a practical implementation of the capability, because manufacturers like Boeing benefit most by being able to use the system with the largest number of its existing machine tools.

Our preferred workstation is an IBM RS6000 running an AIX operating system, but other systems with similar capabilities might also be used. The workstation provides the link between the laser tracker controller and the machine controller. The workstation controls the part program, requests measurements from the laser tracker(s), and provides delta correction commands to the machine to move its end effector (or inspection probe) closer to the intended (design) location. SOMaC removes program control from the NC controller to the workstation. The workstation trickle feeds the program commands of an error correction vector defining a delta correction command to the controller. The laser tracking system controller is currently an IBM compatible PC running under the DOS operating system, but any equivalent processor or operating system can be substituted. Future implementation may combine the laser tracker controller into the workstation.

Figure 5:
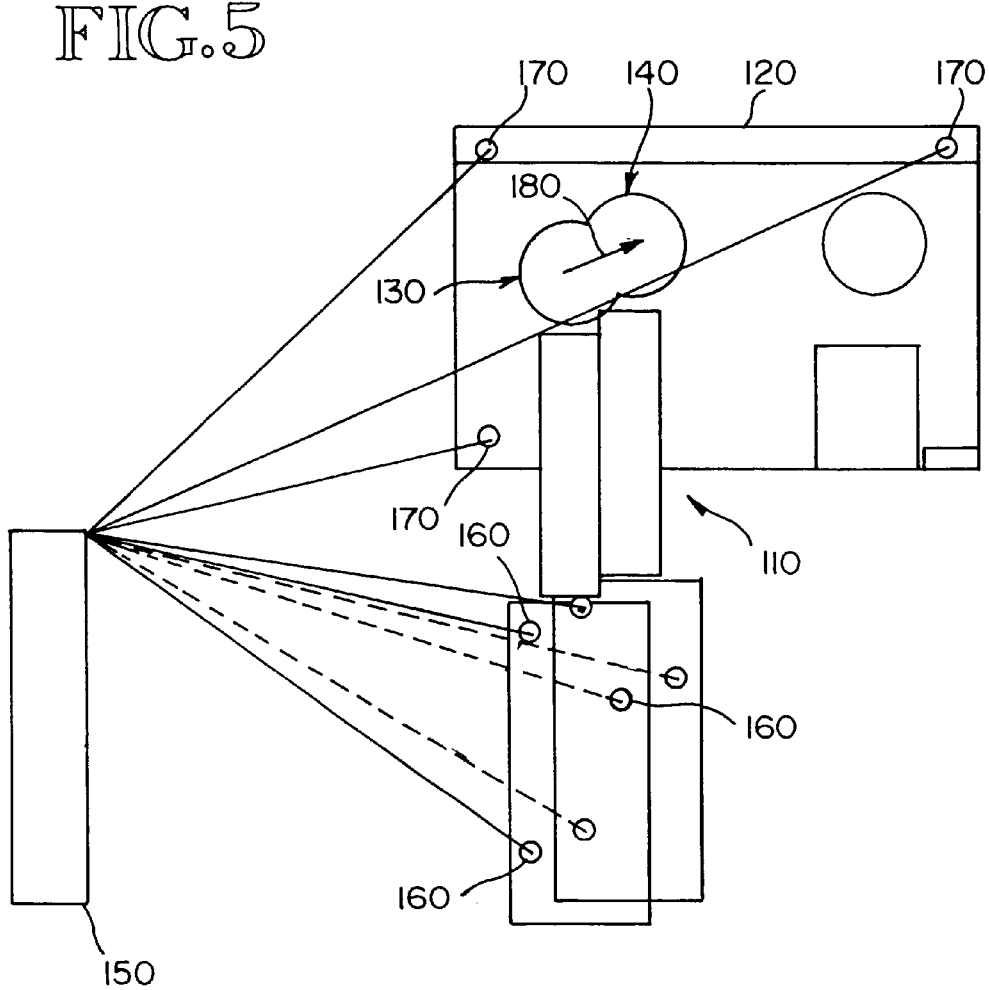
FIG. 5 is a schematic illustrating machine movement in response to the adjustment in machine position that SOMaC provides through an error correction vector to place a hole more accurately at a nominal hole location after the machine has positioned itself to a commanded location.

FIG. 5 illustrates this improvement in machine accuracy. The machine 100 carries a drill 110 to location #1 based upon machine media commands derived from a digital definition of the part 120. In location #1, if the machine were to drill a hole in the part, the hole 130 would be offset from the nominal hole location 140. With SOMaC, the tracker 150 determines the position of the drill 110 using retroreflector targets 160 on the machine 100 and tooling balls 170 on the part 120. SOMaC trickle feeds commands for the error correction vector 180 to the machine 100 to move the drill 110 closer to the nominal hole location 140 using a Threshold—Iteration feedback loop.

Communication between each of the hardware components is serial, using RS-232 or Ethernet. Serial communication is commonly used between machine controllers and other devices, and is particularly suitable for SOMaC because communication between the three computing systems need not be deterministically timed or be at extremely high data rates. The single serial link between the tracker system and the workstation is bi-directionally, half-duplex. The serial link between the workstation and the controller varies among machine controllers. Future implementations may include other communication schemes.

We define a Threshold variable as the allowable dimensional difference between the commanded machine position and the measured machine position. We also define an Iteration variable to determine the maximum number of times that the "move-check-move" loop is allowed to occur before confirming a spatial location or signaling an alarm. The machine pre-positions the end effector at an initial position as commanded by the media. The tracker measures the position and/or orientation of the end effector. The machine commanded position and the tracker measured position are compared, and a decision is made whether to move the machine based on the Threshold value. If the difference is greater than the preset Threshold value, then the machine must be repositioned. After the machine is repositioned, the system must measure the machine position again. This decision whether to remeasure is made based on the Iteration value. For example, if the Iteration value is zero, the trackers will never verify that the machine has been correctly repositioned. In practice, the Iteration value is not set to zero. If an Iteration is required, the tracker remeasures the machine position/orientation. The system compares the positions, sends delta correction commands and continues until either the Iteration counter is exceeded or until the comparison between the machine commanded position and tracker measured position is smaller than the preset Threshold.

If the Iteration counter is exceeded before the Threshold is met, an error message is presented to the operator, who makes a decision about how to continue. Selected values for Threshold and Iteration optimize the efficiency of the operation. Important factors to consider when selecting Threshold and Iteration are (1) the repeatability of the machine, (2) the repeatability of the tracking system, (3) the resolution of the machine, (4) the engineering tolerances to the item to be drilled, and (5) the allowable correction time per hole.

In addition to Threshold and Iteration, the workstation software also preferably includes the following user-definable parameters:

(i) Maximum Incremental Compensation. This parameter is the maximum allowable machine correction for any single machine position. If exceeded, the system produces a warning.

(ii) Maximum Total Compensation. This parameter is the maximum total machine correction for a particular workpiece. if exceeded, the system produces a warning.

(iii) Standard Deviations. This parameter is the allowable variation in multi-sampled machine measurements before the object measurements are deemed reliable.

(iv) Maximum Allowable Temperature Change. If exceeded, the system will not continue machining the workpiece, but re-orients itself to the workpiece to determine if any expansion/contraction or part movement has occurred.

(v) Minimum/Maximum Temperature. If minimum or maximum specified temperature limits are exceeded, the system will stop operations.

(vi) Maximum Change in Differential Inclination. The system incorporates differential inclinometers any number of which can be placed in any orientation on any component in the system (machine/part/tracker). When the relationship between any two inclinometers changes by more than a user definable amount, the system automatically re-orients itself to the part to compensate for any part/tracker/machine movement that occurred.

Generally these parameters are set based upon the worst case accuracy history of the machine and the necessity of producing a part or assembly to the closest reasonable conformity (tolerance) to the engineering specification. Alarms should be triggered when continued operation threatens to produce a nonconforming, unacceptable part so that adjustments are made before rework or scrap results.

Figure 10:
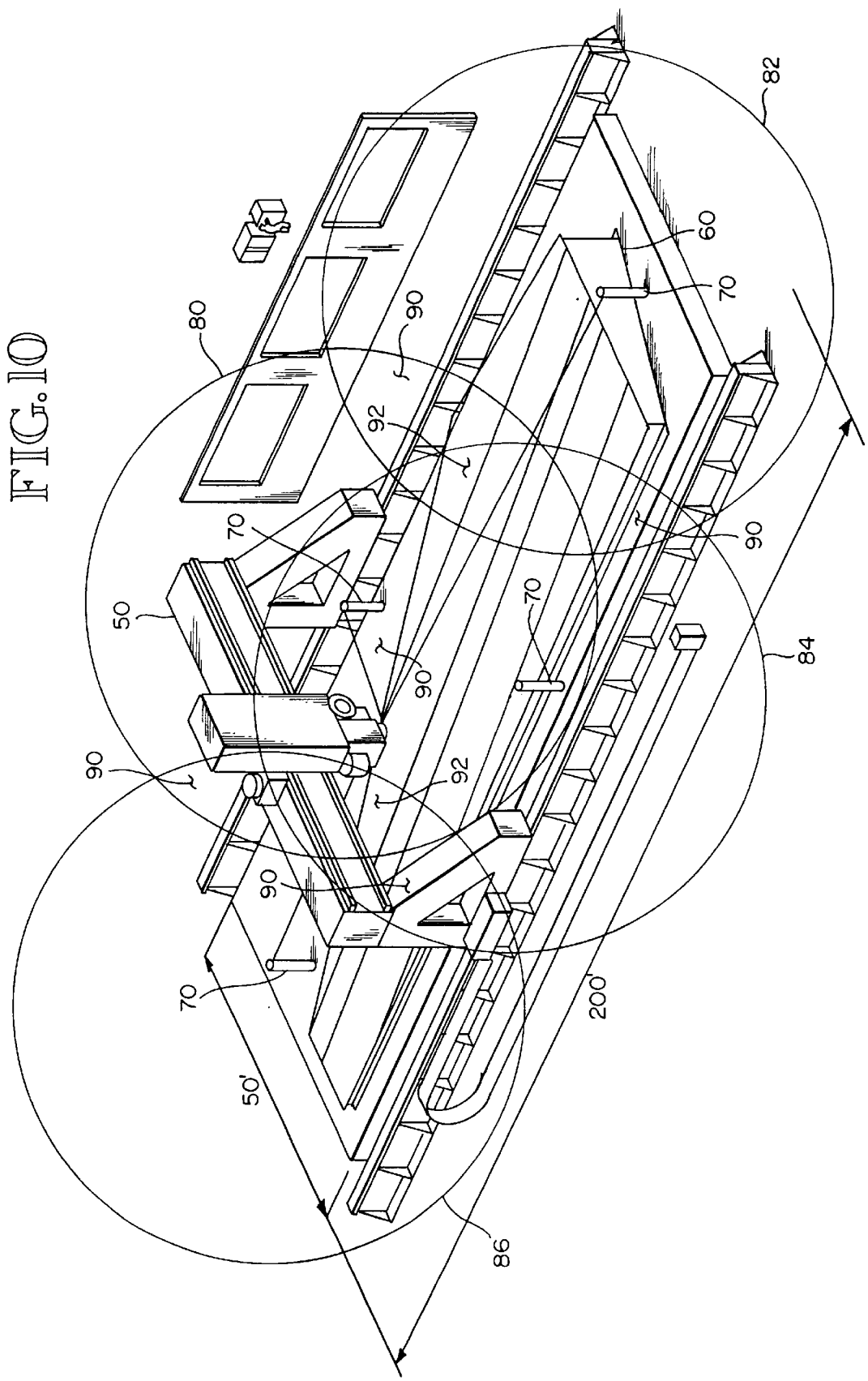
FIG. 10 illustrates a machine using multiple of trackers in separate control zones for controlling accuracy of a gantry mill over a large work envelope.

FIG. 1 illustrates a post mill 10 with a carriage length of up to about 200 feet where two Leica SMART310e or equivalent laser interferometers 20 are positioned at the extremes of the lateral motion. SOMaC is readily adaptable, however, to other conventional machine tools including overhead gantry multiaxis machines, Boeing's automated spar assembly tools (ASAT), GEMCOR riveters, Boeing's Multi Task Gantry Riveting System (MTGRS), and the like. The SMART310 laser interferometer has a range of about 100 feet, so the lateral distance of travel dictates when multiple trackers are required to cover the working envelope. SOMaC can accommodate multiple trackers simultaneously using data combination algorithms and protocols including chief/slave, voter, weighted bundle protocols for the several channels of position data, or it can switch between trackers in sequential working zones. FIG. 10 shows one arrangement of multiple trackers. A gantry mill 50 moves over a part 60 in an area approximately 200 feet long by 50 feet wide. Four trackers 70 are positioned at selected locations around the work area to provide full measurement coverage for the part 60 in coverage zones 80, 82, 84, and 86, which overlap one with another in certain locations. In some overlap volumes, two trackers will be providing measurement data while, in a few volumes 92, three trackers will be measuring. The extreme ends of the work envelope, however, will fall into the coverage zone of a single tracker. For areas of overlap in the sequential tracker system, we prefer to use the weighted bundle control protocol wherever more than one tracker is in range and is providing measurement data to the SOMaC processor. Measurement data from multiple trackers overdefines the system of equations for calculating the transformation. The extra data is redundant or improves accuracy. Weights reflect, in part, the confidence attributable to the accuracy of that tracker's data and are determined by geometry and experience.

One tracking interferometer can provide 3-axis position measurement and control. Multiple trackers operating in the same envelope are required to obtain 4-axis or 5-axis control. With multiple trackers we use combining algorithms that maximize measurement confidence, thereby minimizing error. Newer trackers with absolute ranging capability allow us to control all axes of a machine with a single tracker.

The trackers generally include as a standard feature a refractometer forwavelength compensation for changes in the index of refraction of the factory air. The ranging accuracy otherwise can be significantly effected by changes in temperature, pressure, or humidity in the factory. For the improvements in accuracy that SOMaC seeks, such a correction for the ranging is important to achieve the desired results. With index of refraction adjustment, laser trackers are capable of excellent measurement accuracy in large volumes in real time to parts per million. With this accuracy, the ranging measurements can provide sufficiently accurate true position feedback to improve end point position control of a machine.

II. SOMaC Software Architecture

The SOMaC software has two, main parts: the workstation software and the tracker software. Autoscale and real-time orientation are components of the workstation software that we generally include.

A. Workstation Software

Figure 4:
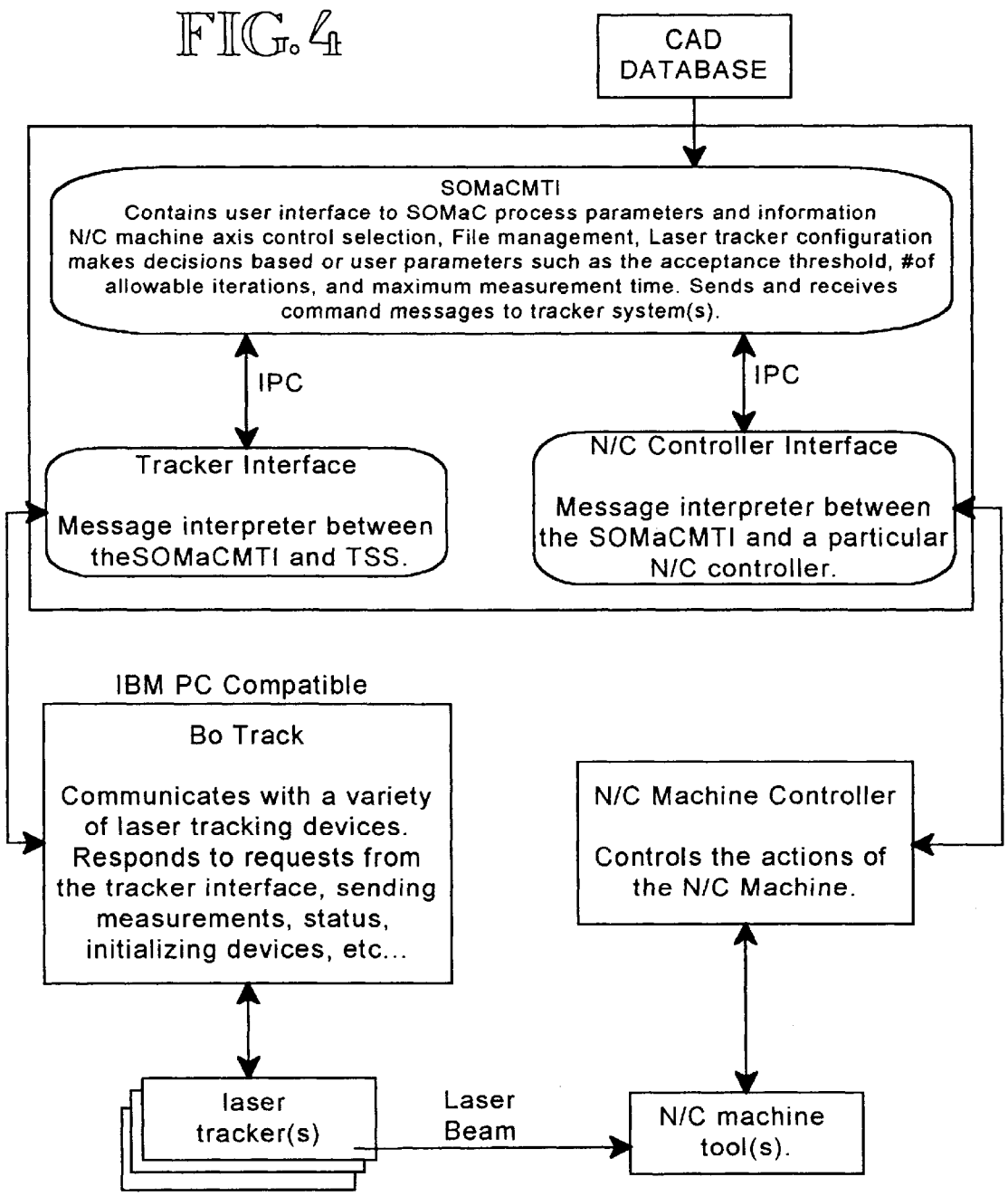
FIG. 4 is a block diagram illustrating the SOMaC interface running on an IBM RS6000 controller so that the conventional machine tool can achieve true position accuracy to produce parts with the accuracy intended in the digital part design (i.e., 3D solid model).

The primary purpose of the workstation software module called "SOMaC" (FIG. 4) is to provide a link between the tracker, the operator, and the machine. SOMaC has several logical pieces or processes each communicating via an Inter-Process-Communication (IPC) technique. The portions of the system which are machine specific have been isolated into separate processes for future "plug-and-play" capabilities, (e.g., incorporating a new machine family).

SOMaC software is "plug-and-play" compatible with the Valisys family of software products (available from Technomatix Technology Corp.), thus enabling communication to a wide variety of NC mills and NC coordinate measuring machines (CMM's) via existing Valisys Machine Tool Interface (MTI) modules. SOMaC uses an interpretive C language or counterpart to drive its operation, although any suitable programming language could be used. The interpreted information is stored in human-readable text files. SOMaC provides the primary graphical user interface (GUI) for the SOMaC process and communicates with other MTIs, isolating itself from machine specifics and increasing its general applicability.

The SOMaC MTI provides the primary human interface for the SOMaC process, and also communicates directly with other MTIs. While this module does not communicate directly with the tracking devices or the NC machines; it communicates with the machine tool interfaces (MTIs) that communicate with the tracking devices. The following functions are preferably integrated into the SOMaC module:

1. User Interface

The user interface is Windows oriented, after the Motif user interface standard.

2. System Configuration Management

The user may specify, store, and retrieve a system configuration. Elements of the system configuration include: the number and type of tracking devices to use; the accuracy Threshold, the Iteration limit; the combination of machine axes to control; display precision; and log file format.

3. Axis Transformations

The tracking system coordinate reference frame is alignable with the reference frame of the machine using "three point fit" or "least squares fit." Three point fit uses only three points in common to the tracker and the machine to calculate the transformation matrix from the tracker frame of reference to the machine frame of reference. Least squares fit performs the transformation using more than three common points. Both methods, however, accomplish the goal of converting tracker measurements into coordinates that are meaningful in the machine coordinate system. Once this transformation has been performed, SOMaC automatically provides for a human-readable, real-time display of actual (laser) machine position that can be read by the operator of the machine and directly compared to the machine independent position display. This transformation is not required to be accurate because future measurements of critical features on the part define the relationship between the tracker and the part.

4. Error Recovery

During a drilling or inspection process, the laser tracker system may lose sight of one or more target on the end effector of the machine and be unable to re-establish contact. The tracking "lock" can be broken if the end effector's retroreflector (target) rotates beyond the usable range, intervening structures block the tracker and retroreflector (target), or poor repair/maintenance obscures them. The SOMaC module provides three error recovery techniques: manual, "look-ahead," and "look-back" from loss of the beam.

The manual method allows the operator to stop the process, and manually return the target to the tracker to re-establish contact. The operator places the target at a known (home) location which the tracker measures. Then, the operator moves the target to the actual position while the tracker tracks the target. In this way, the tracker knows the actual position with reference to the home position.

The "look-ahead" method causes the tracking device to point to the position of the next required measurement, and wait for the target to come into view. When in view, SOMaC can command the tracker to gather an accurate measurement. The look-ahead method can only be used with tracking systems possessing absolute ranging capability. Tracking systems with laser interferometers measure relative changes in range and must therefore have a starting index location with known coordinates of sufficient accuracy. Tracking systems with laser radar ranging systems measure absolute ranges from the tracker to the target, and do not require an accurate index. Therefore these systems can be commanded to "look-ahead" to the next measurement location of the target.

The "look-back" method causes the machine to regress along its path to the point of the most recent measurement before the error occurred. The tracker is then commanded to return to those coordinates, and is able to resume tracking, assuming, then, that the range to the target is the same as when it last was measured. The "look-back" method is susceptible to dimensional errors if the machine repeatability is beyond acceptable tolerance limits, because it relies on the machine to establish the "true" position. Therefore, each use of the "look-back" method introduces an error in the absolute position corresponding to the machine repeatability spatial error. If the beam is lost any significant number if times, drift will occur with the "look-back" method.

5. NC Program Control

The SOMaC module is in control of "trickle-feeding" blocks of motion commands to the machine controller. The SOMaC module allows the operator, the programmer, or a post processor to insert user defined keywords in the motion program which indicate when a tracker inspection of location (and machine adjustment, if appropriate) occurs. Alternatively, existing character strings can be used as keywords. SOMaC accurately updates the machine position with laser tracker data only when it encounters a keyword. The following example uses "Measure SOMaC" as the keyword:

. . .

N101X50.000Y100.000Z5.000A90.00C0.00
N102 (MSG, Measure SOMaC)
N103G1Z2.4
N104X51.00Y101.000Z5.020A90.00C0.00
N105 (MSG, Measure SOMaC)
N106G92X50.000Y100.000Z5.000

. . .

Upon encountering the "Measure SOMaC" keyword, the SOMaC system will prompt the tracking interferometer (or other independent measurement system) to measure the current machine position. When the iteration process is complete for that measurement, the machine is accurately repositioned so that the motion program commanded position and the true spatial position correspond. Then, the block following the keyword is executed. In our example, a hole is drilled (Z 5.000) on block N106. The motion program is displayed to the operator on a monitor as the motion commands are "trickle-fed" to the machine controller so that the operator can confirm part program operation.

B. Tracker System Software

The tracker system software (BoTrack, FIG. 4) is a DOS application written in C which resides on the laser measurement system controller. This software receives commands from the tracker interface, takes measurements, and reports the measured coordinates back to the tracker interface. In addition, this software communicates with a refractometer for wavelength compensation of the laser, as previously described. To update the index of refraction prior to each ranging measurement, the software queries the refractometer for the current index of refraction. The software compares the current index of refraction with the last index of refraction. If the values differ by more than a preetermined amount, such as 0.5 parts per million, the software changes the stored value of the index of refraction to the current value and uses the current value to calculate the distance. In this way, the most accurate environmental conditions are always used when making a ranging measurement and range calculation in the tracker's processor.

This software isolates the SOMaC workstation software from any particular type of measurement hardware or software. This flexibility enhances SOMaC's utility in the factory because SOMaC can be used with any hardware combination it encounters with minimum software development effort.

The software operates in two modes: Automatic and Diagnostic. The automatic mode is used when SOMaC is operational. In the automatic mode, the software automatically responds to commands sent from the SOMaC module. In the diagnostic mode, the operator uses commands in the menu structure to perform various tasks.

C. Autoscale

Next, we will discuss automated spatial adjustment of the NC Media to correct for temperature effects in the manufacturing environment. We generally refer to this feature as "Autoscale."

Numerically Controlled (NC) machine tools receive positioning commands via human-readable machine language, called NC Media or Machine Control Data. The NC Media is generated (either manually or with computer assistance) from an engineering drawing or a Computer Aided Design (CAD) model (i.e., a digital dataset) of the part. The engineering drawings or CAD model represents the desired configuration of the actual part. Real parts, however, usually change size as a function of the ambient temperature. The materials have a coefficient of thermal expansion (CTE) that identifies how much they will expand or contract in response to a change in the temperature. Recognizing this problem, most engineering drawings and CAD models tie the designed dimensions to a specific reference temperature, internationally agreed upon as 20° C. (or 68°F.). The part material is never exactly at 20° C. at the time of machining. So a problem may exist in making the part actually reflect the design intent as established in the engineering drawings or CAD model. If a part is machined when it is hotter than 20° C. (even by just several degrees), the resulting part will probably be dimensionally different than nominal when cooled to the 20° C. reference temperature. Depending on the material, tolerances, and temperature, the machined part may be in tolerance when machined, but out of tolerance when equilibrated to the reference temperature. To make matters worse, each material has a different coefficient of thermal expansion (CTE), and an aircraft assembly can include a large number and wide range of materials. Also, the milling machine changes shape as it expands or contracts with changes in temperature.

The conventional approaches to correct for the change in dimensions and shape that arise from changes in temperature include controlling the temperature of the factory or monitoring the factory temperature and applying an empirical adjustment to the machine encoders in response to the temperature measurement. As we will explain, these solutions, even when combined, do not achieve precision machining.

The effects of temperature on precision manufacture of parts and their subsequent assembly can be quite expensive. Components made in different factories and at different temperatures may not assemble together properly, causing rework, scrap, or schedule delays. The impact is severe especially for assemblies that rely upon accurate placement of coordination features (especially holes) for precise assembly into products more accurately reflecting the engineering design rather than the shape of assembly tooling. U.S. Pat. No. 5,033,014 discusses this design verses tooling problem in greater detail. Aerospace is a field where performance of the product is significantly impacted by even small variations or deviations in the "as-built" assembly from the intended design. Therefore, there is a significant need to adjust machining to accommodate factory and part temperature variations. The solution also must be iterative to allow scaling throughout the machining operation that can continue for hours or days.

Inclination (tilt) of parts and machines is an important consideration because the changes in temperature which cause expansion and contraction can lead to tilting of the machine, part, or tracker. We place inclinometers on each of these to provide an alarm signal that the spatial relationship between them has changed. If a tilt alarm condition arises, the operator must recalibrate the tracker to the part.

Autoscale is a thermal compensation technique applicable to industrial optical inspection systems such as photogrammetry, theodolites, and laser trackers. Autoscale measures the locations of actual part references or features, determines how much the part has actually expanded (or contracted) from its design reference state, and, then, applies a size variation compensation factor (a scale) to subsequent positional operations. The Autoscale technique does not rely upon measurement of the part temperature, but rather relies upon the actual part size. The autoscale factor is a ratio (expressed as a decimal) of the part's "actual" size over the reference size. The scale factor is a "best fit" of the actual part based upon its measured geometry compared to its reference geometry. Actual workpieces exhibit nonlinear changes based upon a number of factors. We check our scale factor against independent temperature measurements and part growth models to minimize disparities and to detect unexpected behavior. We conduct the part position calculations in conjunction with autoscale.

Autoscale functions in three dimensions by assessing the volume change of the part based on movement of the part references or features. While three tooling balls is sufficient for establishing a 3D coordinate system, we prefer to use a larger number of tooling balls to obtain a finer gradation of changes over the work envelope. We can use any three balls to establish a reference plane and can divide the part into zones or can verify bending, bulging, or twisting in the part with the intermediate balls. We implement autoscale using the same tooling balls that we place on parts or tools for conducting theodolite quality inspection. Autoscale is tied to temperature variations with the software we have designed. That is, we make measurements of the tooling balls based upon variations of a sufficiently large (threshold) change in the factory temperature. We might rescale every time the temperature changes by 2° F., for example. Real-time orientation is not tied to a temperature variation trigger for measurement and resealing. Instead, with real-time orientation, the system is rescaling continually before each machining operation by measuring the tooling balls.

For example, if the distance between two holes on a part is 100 inches at the design reference temperature and the actual measured distance on the warm part is measured to be 100.10 inches, the autoscale factor would be 100.1/100.0= 1.001000. If two additional holes need to be drilled into the part at a distance of 200 inches apart, we apply the autoscale factor to the 200 inch desired value, and actually drill the two holes 200.2 inches apart. When the part returns to the reference temperature, the two holes will be exactly 200 inches apart, as desired.

Autoscale or real-time orientation is useful when the part in question must be made over a relatively long period of time, and in various stages, with the possibility of experiencing many different temperature states. In fact, the main effect of autoscale is that the part can be processed in a variety of thermal states, yet when done, conform best to the engineering design dimensions.

Autoscale relies upon a pre-established set of coordinates for a series of features on the part of interest. This data, called a reference file, can be generated from any inspection system with sufficient accuracy for the application. The coordinates in the reference file represent the position of the features (usually in the part reference system) typically, at 20° C. The coordinates are determined by inspecting the part while equilibrated at the design reference temperature, or by scaling inspection data. This reference file becomes a unique data set that is associated with the part and can be used in the next steps of the autoscale process.

Autoscale:
(1) Creates a reference CAD file for the part (fly-away hardware, tools, gages, holding fixtures, etc.);
(2) Mounts the part to the machine bed;
(3) Measures the references (using a machine touch probe or an independent inspection system);
(4) Calculates the scale factor;
(5) Applies the scale factor to the machine control media;
(6) Prepares the machine for machining at the adjusted coordinates; and
(7) Continues to machine the part at the reset scale until the temperature has changed sufficiently to merit resealing, or rescales continually (for the real-time orientation implementation).

Autoscale measures the factory ambient temperature or the part temperature, or both. The increments for triggering a rescaling are selected at intervals where the temperature change will produce identifiable changes in the machining accuracy, and generally is 2–5° F. (1–2.5° C.). Continuous scaling generally is not required. Selecting reasonable rescale increments reduces computer processing.

D. Real-Time Orientation

Temperature is only one factor to consider. Accurate placement of features on parts requires accurate machines. Large machines, especially drilling machines, are inherently inaccurate because of temperature variation, ground movement, machine positioning accuracy (straightness, squareness, linear positioning, etc.), or wear. The most frustrating problems, of course, are the environmental conditions that are difficult to control and are unpredictable and difficult to reproduce, like ground movement associated with ocean tides. The effects are often nonlinear or chaotic. They can alter the spatial relationship of the machine and the part during a manufacturing run which produces inaccuracies.

Making the machines and tools massive so that they resist twisting and bending from natural, external forces is common and is expensive. For the most accurate machining, frequent calibration and re-calibration is required which increases cost. The time required to calibrate can be longer than the periodicity of the phenomenon (tides, temperature, etc.) which alters the part-machine spatial relationship. If the calibration is slower than the period of the variation, the calibration adjustments will be difficult to make to an acceptable degree of certainty.

In our preferred embodiment, we implement real-time orientation (RTO) using absolute ranging tracking interferometers. These devices are able to measure the distance accurately to an optical target, and can be pointed via rotary controls to collect data from a series of targets. The combination of distance and angle measurements are converted to a 3D spatial location for each target location. Large parts are accurately constructed by first creating reference locations or critical features within the part volume. These critical features are "inspected" by operators to locate the part accurately in correlation with the features and coupled within the machine's coordinate system. Often, the critical features are "tooling balls" or spheres mounted on pins which are accurately located on the part.

The real-time orientation process:
(1) Determines the relationship (nominal) between the tracker and the machine by running the machine along a predetermined path while monitoring position with the tracker;
(2) Creates a reference program that defines a series of 3-dimensional locations for a set (minimum of 3) of optical targets mounted on a part;
(3) Between each drilling operation, measures the location of each target with the tracker;
(4) Computes the mathematical transformation between the nominal locations and the current locations of the reference targets;
(5) Applies the transformation to the machine media; and
(6) Feeds the transformed media to the machine.

Figure 6:
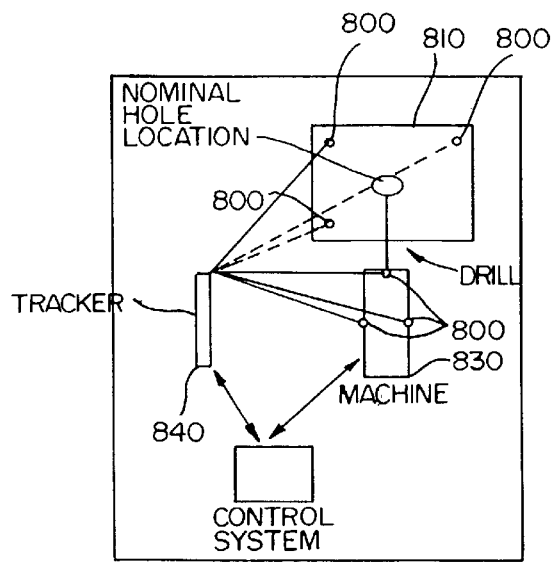
FIG. 6 illustrates the process for establishing a spatial reference between a machine and a part.
Figure 7:
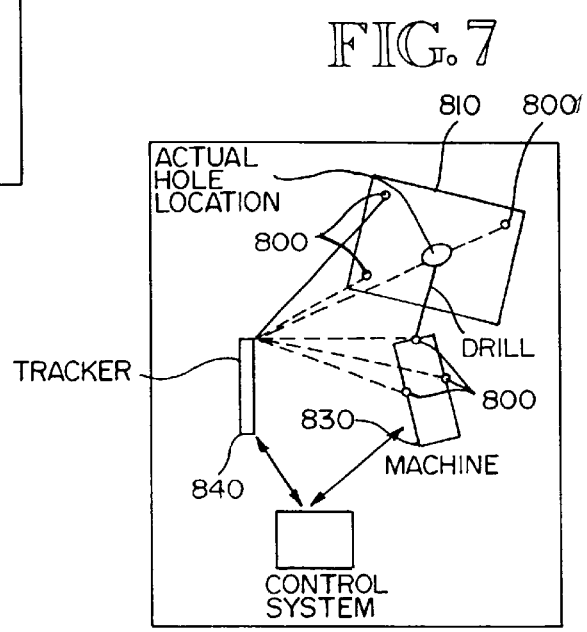
FIG. 7 illustrates the transformation process for adjusting the machine media to account for movements of the machine, part, or both after establishing the spatial reference of FIG. 6.

The measurements permit the machine to drill, in our case, in the intended location despite translations or rotations of the part, the machine, or both. FIGS. 6 & 7 illustrate the process. In FIG. 6, RTO establishes the common reference between the machine and the part. With both the machine and part translated to an offset position, as shown in FIG. 7, the RTO measurements produce a transformation (i.e. an error correction vector) for the machine media to still allow the machine to drill at the intended (nominal) location. That is, RTO allows accurate machining despite movement of the machine, part, or both and despite growth or shrinkage of the machine, part, or both. RTO accommodates the "necessary evils" of actual manufacturing with a robust solution-(at least for machines with 5-axis capability).

Our technique relies upon a pre-established set of coordinates for a series of optical targets on the part of interest. The software provides a method for defining, pre-measuring, and then orienting to the targets. When the targets change position as a result of mechanical, thermal, or other effects, a best fit location of the set of targets is tracked. NC media, which is being fed to the machine controller, is modified on-the-fly as the part is being drilled in correlation with the measured position and orientation changes in the part. Between drill operations, the position of the part is monitored. The next drill operation is shifted and scaled by a scale factor as appropriate to place that hole in the correct location relative to the previous holes and the engineering design.

For real-time orientation, the actual position of the reference features is monitored continually or incrementally between each machining operation with absolute ranging laser trackers. The computer calculates the coordinate transformation that has occurred between the design (nominal) locations of the reference and the actual, measured locations and applies the appropriate scaling factor to adjust the NC media.

Figure 8:
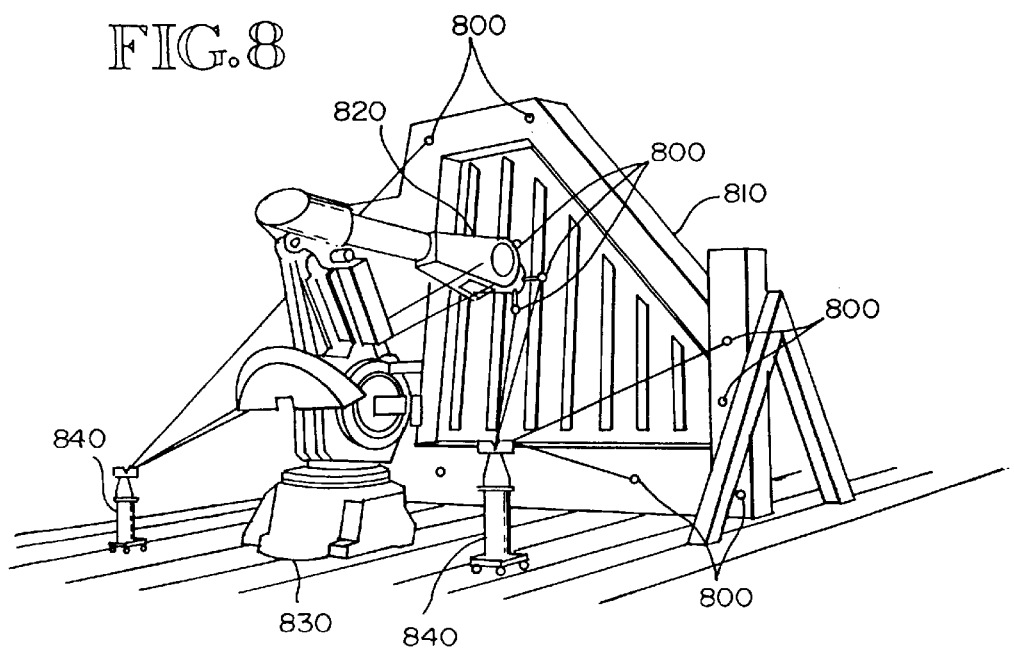
FIG. 8 illustrates a machine tool adapted for real-time orientation using absolute ranging laser interferometers and SOMaC to control the drilling and tooling ball references on a part jig.

The following simple example and FIG. 6–8 illustrate the real-time orientation process. At least three optical targets 800 are on the part 810, and at least three are on the end effector 820 of the machine or robot 830. They are spaced on the part to represent its physical characteristics. Using many targets on the part can provide enhanced sensitivity or detail in areas of critical concern. The part's initial location is measured by determining the locations of its targets. For each drill location the tracker or trackers 840 measure the locations of the targets on the machine and on the part and SOMaC computes the appropriate scale factor and position adjustment. A delta correction command adjusts the machine media to move the cutter to the actual location for its next operation. Changes in the machine-to-part relationship are unimportant if the machine is a 5-axis (6degree of freedom) machine tool. That is, the drill tip on a 5-axis drilling machine or robot can be fully compensated for errors in translation and rotation, if the changes are slow with respect to the machining operation (such as those associated with tide or temperature changes). A minimum of three optical targets 800 on the machine 830 and on the part 810 is required to track both the part and the machine in six degrees of freedom. Adjustments are made based upon the last measured position of the part and the machine or from the engineering design reference.

Measuring the location of the part and the machine for real-time orientation takes up to about 10 seconds for the six optical ranging measurements, when we allow time in the measurement to cancel out thermal noise. How often the operator should take the ranging measurements depends upon the rigidity of the machine, the temperature fluctuations and rate of change in the factory, the inclination of the machine with respect to the part, and the timespan between machining operations, among other factors. The system can easily accommodate temperature, tilt, time, or other suitable alarms to force recalibration (ranging measurements) at prescribed intervals. Commands in the NC media can also trigger ranging measurements at predetermined points in the machining, as previously described, which is especially important for locating coordination features accurately.

While described with reference to machining, the autoscale and real-time orientation processes also have application to inspection. The SOMaC system can be used to machine the part accurately, but it also could be used to inspect the machined part. Inspection is probably as important a function as controlling the machining because it reduces the costs associated with purchasing and maintaining special inspection tooling, especially a coordinate measuring machine (CMM); transferring the part to the coordinate measuring machine; and establishing a known spatial relationship between the part and the CMM to allow ultimate inspection of the part. By inspecting the part on the machine, it is possible to discover when the root cause for changes in the part configuration that arise after removing the part from its tooling on the machine are actually the result of design errors or transportation accidents rather than inaccurate machining. For inspection, an inspection probe replaces the cutter in the machine spindle. The machine moves the probe in accordance with the intended digital definition through the predetermined inspection routine. At each location where inspection of a feature will occur, the SOMaC software has the tracker apply the appropriate positional adjustments for machine inaccuracy and for environmental errors.

The techniques of the present invention compensate for real world external events rather than trying to control or eliminate the natural occurrence of these events. They produce parts of unprecedented precision and accuracy faster than achievable even with the most highly skilled craftsmen working in the most controlled environments. These processes allow simple, low-cost machines to produce accurate parts and pave the way for lean and agile manufacturing in the aerospace industry. Common machines can be used to make a wide range of parts to extraordinary accuracy and precision, thereby greatly reducing capital cost and factory size.

III. Calibrating the System

Initially, the tracker and machine are "aligned" by running an alignment media program. The program directs the machine through a representative volume on a predetermined course while the tracker is "tracking" (i.e., recording the motion). The relationship between the tracker's coordinate system and the machine's coordinate system is then computed to provide "rough" alignment. The relationship is "rough" because the position of the part relative to the machine is inexact. Also, the machine's motion includes the inherent machine inaccuracies from the ideal.

A probe measures critical features on the part, usually by touch, using, for example, Valisys inspection software, as shown in FIG. 6. We compute a transformation between the tracker's measured data and the reference system that is designed into the part in its digital definition as translated in the NC Media. The transformation is based on the measurement of the critical features with the touch probe (which is corrected based on laser feedback from the rough alignment process). The part location, based on the critical feature information, is now completely known in the tracker's reference frame. The software re-orients the NC Media to comply with the "as-positioned" location of the part. Realigning the part is not required. Of course, the actual part location and the reference location from the design data must be close enough to the desired location of the part for the inspection probe to assess the part in approximately the correct position. The inspection probe must actually identify the intended feature. The software allows the operator to "teach" the system where the part is by using a simple single point inspection operation (teach point). Everything then locks into place by refining the part location with critical feature inspections. The tracker can also measure critical feature locations (reflective targets that are mounted on the part) that allow operation completely independent of Valisys and independent of the machine's coordinate system. The tracker will measure the part location directly, and then guide the machine to the right spot on the part based on the CAD design intent of the engineering specification. The position of the critical features must be expressed in the same reference frame as the NC media.

Additional details of the SOMaC system are provided in our article: "Optical End-Point Control for NC Machinery," SAE 97MP-12, Jun. 4, 1997, which we incorporate by reference.

Figure 9:
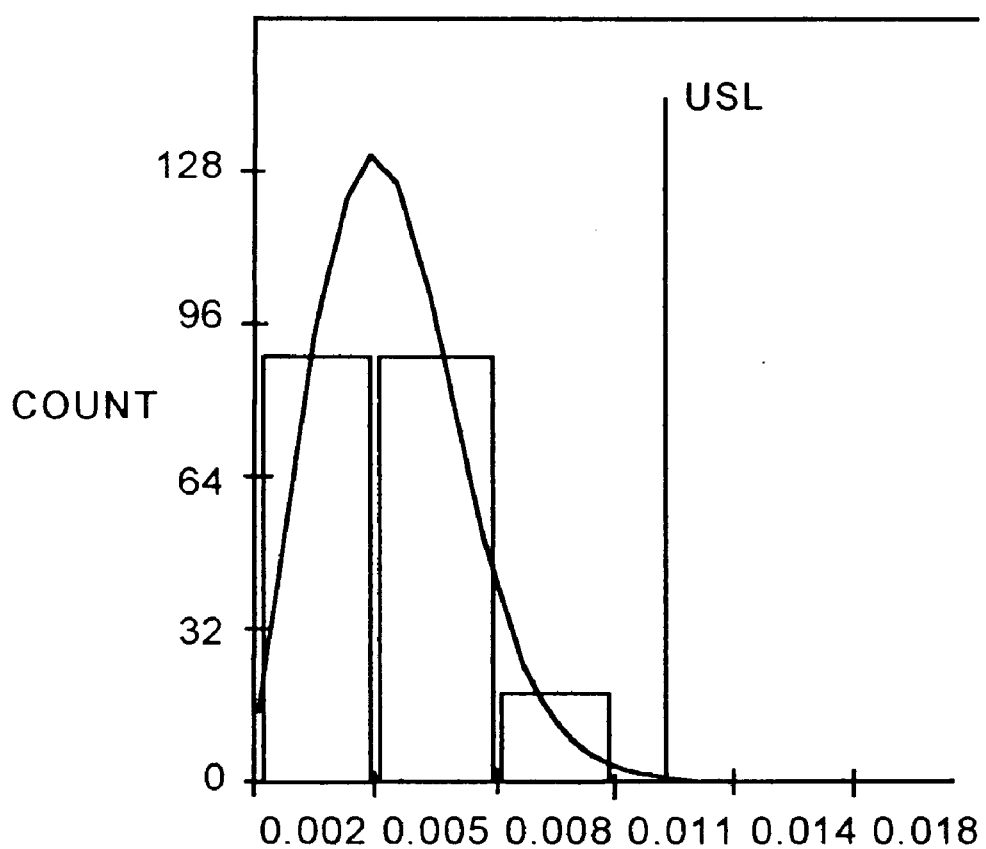
FIG. 9 is a typical histogram plot for hole placement on a part.

FIG. 9 is a typical histogram illustrating the actual measured accuracy and precision (repeatability) of the hole placement that SOMaC control can provide. The graph plots the offset in the true position of the hole from the intended location along the ordinate (X axis) and the count for the number of holes being that accurate on the (Y axis) for 197 0.3275 inch diameter holes drilled with a post mill under SOMaC control. The position of the holes was determined with Valisys inspection analysis tools. Holes being offset by 0.0 to 0.001 inches were counted as 0.001. Those from 0.0011 to 0.002 were counted as 0.002 inches offset, and so forth for the range. The true position is offset from the intended design position by a mean error of only 0.004 inches (a radial positioning error of only 0.002 inches) with a standard deviation of the position offset of 0.002 inches. These holes were drilled using "best machining" practices. This distribution and the results commonly attained with SOMaC is tightly arranged around the mean showing a well-controlled process with high reliability, repeatability, and confidence. Parts made under SOMaC control have smaller part-to-part variation than those made using traditional methods. Features, especially coordination holes, are located on the parts consistently closer to their intended (design) location. The control of variability greatly simplifies assembly, and, in doing so, SOMaC achieves significant cost savings.

SOMaC's application to the manufacture of wings and fuselage assemblies heralds industry's first use of an automated, laser-guided drilling machine. The automated data feedback from the true position measurement of the laser trackers guided the drill closer to the intended true position of the design by commanding positional adjustments. Holes were drilled to within 0.007 inch tolerance of the engineering specifications. Their location, size, and depth were accurately controlled. About 7000 holes were drilled for each wing for attachment of the skin, fuselage, boom, fairing, and access door(s). SOMaC eliminated acquisition of expensive tooling, which otherwise would have been necessary for this task. SOMaC produced high quality parts and eliminated costly rework commonly associated with manual drilling. The precision drilling enhances vehicle performance by producing consistent, precise countersinks and enables smaller edge margin tolerances to reduce the weight of the vehicle.

SOMaC preferably takes tracker measurements when the machine stops. The distinction between static and dynamic machine operations has not been made in the past, and has hindered deployment of end-point control using 3D laser systems. Static machine operations (e.g. drilling, probing, boring, riveting, and countersinking) require that the machine become stationary (stop) before performing the operation. For example, as a drilling machine prepares to drill a hole, it first pre-positions the drill over the hole location. Then, when motion is substantially stopped, the machine moves the drill along a single axis. Static machining operations include drilling (and its related operations), spot welding, initial positioning of a cutter prior to beginning machining on a part, and the like. Dynamic machine operations move along multiple axes in a continuous mode to drive a cutter through the workpiece along a programmed path.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

We claim:

1. A method for improving the accuracy of machines in a factory, comprising the steps of:
   (a) driving a machine tool having an end effector to a first commanded location based upon machine control commands operating through a machine controller, the commands being generated from a digital definition of the part or assembly on which the machine tool works;
   (b) precisely measuring the true position of the end effector when the machine tool stops at the first commanded location;
   (c) comparing the measured position with the first commanded location in a computer;
   (d) sending delta correction commands from the computer to the machine tool to adjust the position of the end effector if the difference between the measured position and commanded position exceeds a predetermined threshold; and
   (e) scaling the commanded position as derived from the digital definition with a configuration scale calculated in the computer based upon real-time measurement of a change in location of critical features on the part, assembly, or associated tooling and adjusting the delta correction commands in response to the same configuration scale.

2. The method of claim 1 further comprising the steps of:
   (i) upon the occurrence of a temperature change of the part, the machine, or the factory of a predetermined increment, adjusting the commanded position derived from the digital definition with a scale factor based upon measurements of the actual dimensions of the part during machining;
   (ii) drilling a first hole in a workpiece with the machine tool after completing steps (a)–(e) of claim 1 and after scaling the commanded position;
   (iii) repeating steps (a)–(e) of claim 1 and scaling the commanded position to move the machine tool to a second commanded location, the second commanded position corresponding to the location of a second hole in the workpiece according to the digital definition; and
   (iv) after step (iii), drilling a second hole in the workpiece with the machine tool at the second commanded location, and optionally, the method further comprises the step of measuring the machined workpiece using an inspection probe mounted in the machine tool and guided to a machine commanded position of inspection features with machine commands derived from a digital definition of the part, the measuring involving measuring a set of inspection features, the measuring being conducted to accept the part and being augmented by providing delta correction commands to the machine to increase its accuracy, the delta correction commands being derived from comparing in the computer measurements of true position of the inspection probe as measured with an independent measuring system in communication with the computer with the machine commanded position.

3. An accurately drilled workpiece obtainable by the method of claim 2.

4. A method for improving the accuracy of machines in a factory, comprising the steps of:
   (a) driving a machine tool under the control of a machine controller and having an end effector to a first commanded location based upon commands generated from a digital definition of the part or assembly on which the machine tool works;

(b) precisely measuring the position of the end effector when the machine tool stops at the first commanded location;

(c) comparing the measured position with the first commanded location in a computer;

(d) sending delta correction commands from the computer to the machine controller to adjust the position of the end effector if the difference between the measured position and commanded position exceeds a predetermined threshold;

(e) scaling the commanded position for thermal effects resulting from a temperature change of the part, the machine, or the factory of a predetermined increment by adjusting the commanded position as derived from the digital definition with a scale factor based upon measurements of the actual dimensions of the part during machining, including the steps of:

(1) measuring the dimensions of a part as an initial reference;

(2) remeasuring the dimensions of the part when the machine tool stops at the first commanded position;

(3) comparing the remeasurement with the initial reference to compute a scale factor; and (4) adjusting the digital dataset representation or commanded location based upon the scale factor;

(f) optionally, scaling the commanded position as derived from the digital definition with a configuration scale based upon measurement of a change in location of critical features on the part, assembly, or associated tooling and adjusting the delta correction command in response to the configuration scale; and (g) optionally, measuring the machined part using an inspection probe mounted in the machine and guided to a machine commanded position with machine commands derived from a digital definition of the part, the inspection involving measuring a set of inspection features, the measuring being conducted to accept the part and being augmented by providing delta correction commands to the machine to increase its accuracy, the delta correction commands being derived from comparing measurements of true position of the probe with the machine commanded position.

5. The method of claim 4 wherein the scale factor is the ratio of the remeasurement to the initial reference.

6. The method of claim 4 wherein the scale factor is a first order correction that alters a dimension along any axis in a Cartesian coordinate system by a common scalar so that the scaling assumes that the part is isotropic.

7. Information storage media, comprising:

computer software storage media having computer-readable information recorded to determine the scale factor according to the method of claim 4.

8. A method for improving the accuracy of machines, comprising the steps of:

(a) moving an end effector on a machine to a first machining location using machine media processed in a machine controller, the media providing a commanded location derived from an engineering specification of a part;

(b) stopping movement at the first location;

(c) when stopped, measuring the true position of the machine at the first machining location with an independent, high accuracy measurement device separated from the machine;

(d) in a computing system communicating with the machine controller and the measurement device, comparing the true position with the commanded position derived from the engineering specification for moving the end effector to the first machining location; and (e) feeding delta correction trickle feed commands from the computing system to the machine controller to correct the first machining location if the comparison between the true position and the first machining location exceeds a predetermined offset threshold.

9. A method for improving the accuracy of a machine, comprising the steps of:

(a) moving a machine tool using machine media derived from an engineering specification of a part, the media being processed in a machine controller;

(b) independently measuring the true location of the machine tool with an independent, optical measurement system separated from the machine but in proximity with the machine, the measurement system using a laser for determining three-dimensional position, the measuring occurring after the machine tool stops after moving according to step (a); and (c) feeding position adjustment commands to the machine controller of the machine tool from a computer to correct the location of the machine tool established by moving the machine tool in step (a), the adjustment commands being based upon a comparison in the computer of the true location and that location intended by the machine media.

10. A method for improving the accuracy of machines in a factory, comprising the steps of:

(a) driving a machine tool having an end effector to a first commanded location based upon commands generated from a digital definition of the part or assembly on which the machine tool works;

(b) precisely measuring the position of the end effector when the machine tool stops at the first commanded location;

(c) comparing the measured position with the first commanded location in a computer;

(d) sending delta correction commands from the computer to the machine tool to adjust the position of the end effector if the difference between the measured position and commanded position exceeds a predetermined threshold;

(e) scaling the commanded position in the computer for thermal effects resulting from a temperature change of the part, the machine, or the factory of a predetermined increment by adjusting the commanded position as derived from the digital definition with a scale factor based upon measurements of the actual dimensions of the part during machining, including the steps of:

(1) measuring the dimensions of a part as an initial reference;

(2) remeasuring the dimensions of the part when the machine tool stops at the first commanded location;

(3) comparing the remeasurement with the initial reference in the computer to compute a scale factor; and (4) adjusting the digital dataset representation or commanded location in the computer based upon the scale factor.

11. The method of claim 10 wherein the position measurement is done optically.

12. The method of claim 10 wherein the delta correction commands are machine media statements of position adjustment.

13. The method of claim 10 wherein measuring the position of the end effector includes interrogating at least one retroreflector on the machine with an independent measuring device.

14. The method of claim 10 further comprising the step of:

scaling the commanded position as derived from the digital definition with a configuration scale based upon measurement of the change in location of critical features on the part, assembly, or associated tooling and adjusting the delta correction command in response to the configuration scale.

15. The method of claim 10 further comprising the step of:

measuring the machined part using an inspection probe mounted in the machine and guided to a machine commanded position with machine commands derived from a digital part definition, the inspection involving measuring a set of inspection features, the measuring being conducted to accept the part and being augmented by providing delta correction commands to the machine to increase its accuracy, the delta correction commands being derived from comparing measurements of the true position of the probe with the machine commanded position.

16. Information storage media, comprising:

computer software storage media having computer-readable information recorded to determine the scale factor according to the method of claim 10.

17. A method for improving the accuracy of machines in a factory, comprising the steps of:

(a) driving a machine tool having an end effector and a machine controller processing machine media to a first commanded location, the machine media being based upon commands generated from a digital definition of the part or assembly on which the machine tool works;

(b) stopping the machine tool end effector;

(c) precisely measuring the position of the end effector with an independent measuring system separate from the machine tool when the machine tool stops at the first commanded location;

(d) comparing the measured position with the first commanded location in a computer; and (e) sending delta correction commands in machine media from the computer to the machine tool to adjust the position of the end effector if the difference between the measured position and commanded position exceeds a predetermined threshold.

* * * * *